United States Patent [19]
Terasawa et al.

[11] Patent Number: 5,832,173
[45] Date of Patent: Nov. 3, 1998

[54] APPARATUS FOR REPRODUCING A VIDEO SIGNAL RECORDED ON TAPE AND FOR SEARCHING THE TAPE

[75] Inventors: Hideo Terasawa, Kanagawa; Hisato Shima, Chiba; Brian Toru Yamanaka, Tokyo, all of Japan

[73] Assignee: Sony Corporation, Tokyo, Japan

[21] Appl. No.: 914,954

[22] Filed: Aug. 20, 1997

Related U.S. Application Data

[63] Continuation of Ser. No. 229,054, Apr. 18, 1994, abandoned, which is a continuation of Ser. No. 977,107, Nov. 16, 1992, abandoned.

[30] Foreign Application Priority Data

Nov. 28, 1991 [JP] Japan ................................. 3-340323
Nov. 30, 1991 [JP] Japan ................................. 3-342298

[51] Int. Cl.⁶ .................................................... H04N 5/91
[52] U.S. Cl. ................................ 386/69; 386/81; 345/328
[58] Field of Search ................. 360/72.1, 69, 14.1–14.3, 360/10.1–10.3, 13; 358/335, 311–312; 345/140, 328; 395/140, 159, 161; 306/52, 55, 66, 69, 80, 63, 81; 707/530

[56] References Cited

U.S. PATENT DOCUMENTS

| | | | |
|---|---|---|---|
| 4,200,893 | 4/1980 | Matison | 360/72.1 |
| 4,210,785 | 7/1980 | Huber et al. | 360/14.3 X |
| 4,539,603 | 9/1985 | Takeuchi et al. | 360/69 X |
| 4,692,819 | 9/1987 | Steele | 360/72.1 |
| 4,789,973 | 12/1988 | Mabuchi | 369/24 |
| 4,812,940 | 3/1989 | Takenage | 360/72.1 X |
| 4,937,037 | 6/1990 | Griffiths et al. | 345/140 X |
| 5,157,561 | 10/1992 | Makise et al. | 360/70 |
| 5,202,961 | 4/1993 | Mills et al. | 395/159 |
| 5,206,767 | 4/1993 | Heep | 360/72.1 X |
| 5,225,945 | 7/1993 | Mine et al. | 360/13 |
| 5,386,581 | 1/1995 | Suzuki et al. | 395/800 |
| 5,388,197 | 2/1995 | Rayner | 395/154 |
| 5,513,306 | 4/1996 | Mills et al. | 395/161 X |

FOREIGN PATENT DOCUMENTS

| | | | |
|---|---|---|---|
| 0186901 | 7/1986 | European Pat. Off. | H04N 5/782 |
| A0357909 | 3/1990 | European Pat. Off. | G08C 23/00 |
| A0390041 | 10/1990 | European Pat. Off. | H04B 1/20 |
| A2663140 | 12/1991 | France | G06K 11/18 |
| 2124056 | 2/1984 | United Kingdom | H04N 5/76 |
| WO8706415 | 10/1987 | WIPO | H04N 5/76 |

OTHER PUBLICATIONS

Patent Abstract of Japan, vol. 12, No. 112 (P–687) 9 Apr. 1988 & JP–A–62 241 193 (Sony Corp.) 21 Oct. 1987 * abstract *.

IBM Technical Disclosure Bulletin, vol. 34, No. 6, Nov. 1991, New York US, pp. 36–38, 'Digital Video Direction and Speed Controls' * the whole document*.

Schertz et al., "Ein Grafik–Display Fur Schnittsystmw" Rundfunktech. Mitteilugen vol. 30, No. 6, Nov. 1986, pp. 281–287.

Sony "Digital Audio Tape Deck Operating Instructions" copyright 1990 pp. 1–54.

*Primary Examiner*—Andrew L. Sniezek
*Attorney, Agent, or Firm*—Jay H. Maioli

[57] ABSTRACT

A reproducing apparatus of a video tape recorder or the like determines a tape search status and facilitates conducting a search. The reproducible region is displayed on a graph, and a search marker and a reproducing position are indicated on the graph. Furthermore, it is possible to set the search marker on the graph.

19 Claims, 15 Drawing Sheets

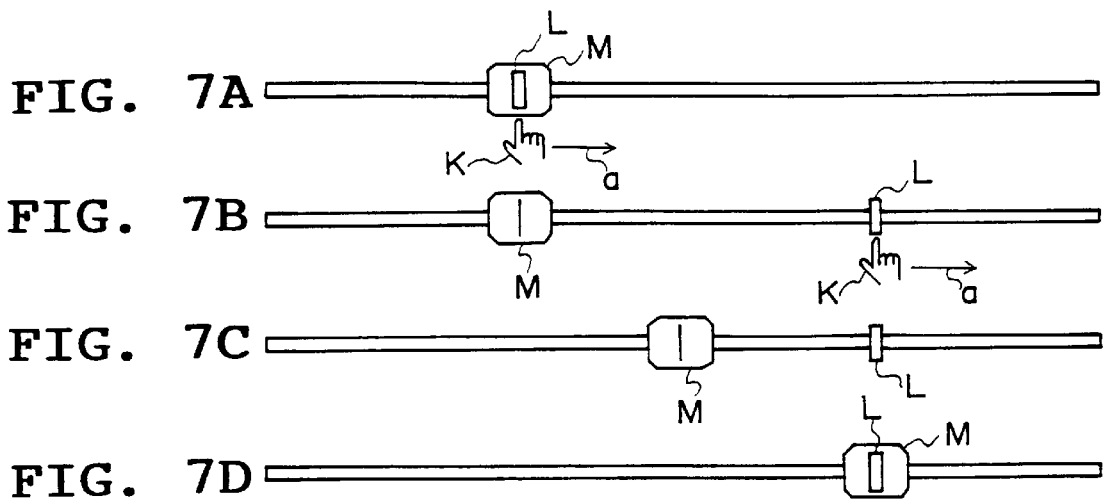
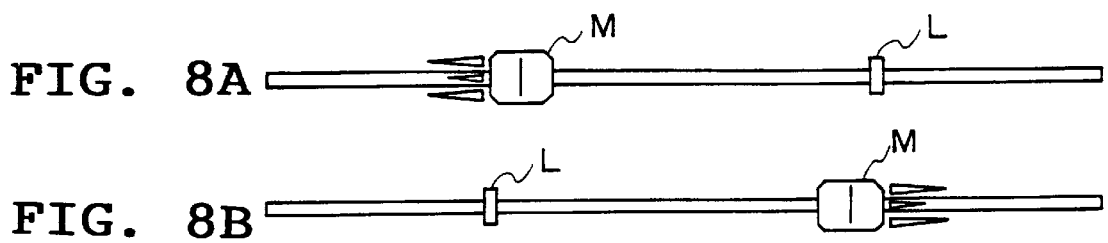
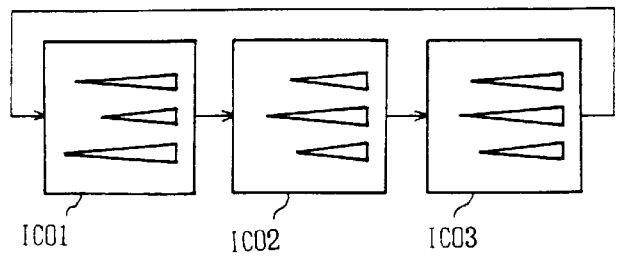
FIG. 9

APPARATUS FOR REPRODUCING A VIDEO SIGNAL RECORDED ON TAPE AND FOR SEARCHING THE TAPE

This is a continuation of application Ser. No. 08/229,054 filed Apr. 18, 1994, which is a continuation of application Ser. No. 07/977,107 filed Nov. 16, 1992, both now abandoned.

BACKGROUND OF THE INVENTION

1. Field of the Invention

The present invention relates to an apparatus for reproducing a video signal, and is suitably applied to a reproducing apparatus such as a video tape recorder which executes various operations making a search for a record content, for example.

2. Description of the Prior Art

In the video tape recorder, there have been heretofore proposed various kinds of operation methods for improving facility for use, which are capable of searching desired record content with ease.

More specifically, in video tape recorders having simple constructions it is possible to search the record content by repeating fast forward mode and reproducing mode, visually confirming the tape counter, for example.

On the other hand, there is another method of searching the record content by fast forwarding and reproducing, for example.

In the method using the repeating of the fast forward mode and the reproducing mode, and the method using the fast forwarding and reproducing, there is however a disadvantage that the desired record content cannot be searched with ease. For this reason, it is proposed to search record content by referring to index signals previously recorded in a control track or the like.

However, there is a problem in that it is hard to intuitively determine time necessary for the search, a feed of the magnetic tape for the search, etc., in such cases: the repeating of fast forward mode and reproducing mode, fast forwarding and reproducing, and the referring to index signals.

Particularly in the video tape recorder, there is a disadvantage such that it takes time also in conducting fast forward and reversing of a magnetic tape. It is considered that if in such events, it is possible to intuitively determine the current position, a marker position, etc., under search, this kind of reproducing apparatus would be enhanced in operability and become convenient.

More specifically, in the case where the reproducing speed is controlled using operation buttons in video tape recorders, there are, as shown in FIG. 1, arranged operation buttons 2, which indicate the reproducing speed, in addition to the operation buttons 1 such as play, fast forward and reverse buttons.

This enables that the reproducing speed is changed to $\frac{1}{10}$ time speed, $\frac{1}{5}$ time speed and twice speed by pressing respective operation buttons having $\frac{1}{10}$, $\frac{1}{5}$ and x2 indicated on them after the play button, for example, is depressed. The reproducing speed may be changed by such a simple operation as to press operation buttons 2.

In another case of using a so-called shuttle ring 4 as shown in FIG. 2, the video tape recorder switches the reproducing speed in response to an amount of revolutions of the shuttle ring 4, and the reproducing speed may be continuously changed in response to the user's operation.

In controllers for the exclusive use in video tape recorders, the operation buttons and the shuttle ring as shown in FIGS. 1 and 2 are displayed in exclusive screen, and the reproducing speed may be indicated through the display screen.

However in the case where the operation buttons of the reproducing speed are merely arranged as shown in FIG. 1, the reproducing speed is limited to the range which can be set by operation buttons, and there is furthermore a disadvantage in that the reproducing speed may not be continuously changed.

Moreover, there are such disadvantages that the disposal area of the operation buttons increases, and that it is hard to sensitively grasp the reproducing speed.

In the case of using a shuttle ring, it is hard to start reproducing speed at a desired reproducing speed at once. Furthermore in the case of combination with an operation button such as an ordinal reproducing button, switching of the mode between the operation button and the shuttle ring is necessary each time.

Even if the shuttle ring is used, there is a disadvantage in that it is hard to intuitively grasp the reproducing speed, and as a result, it is still insufficient in operability.

SUMMARY OF THE INVENTION

In view of the foregoing, an object of the present invention is to provide an apparatus for reproducing a video signal which is capable of intuitively determining the search status in searching the record content and improving a facility for use.

The foregoing objects and other objects of the invention have been achieved by the provision of a reproducing apparatus in which a predetermined recording medium is reproduced and the reproduced signal is sent out; a reproducible region of the recording medium is displayed in a graph; and the current reproduction position M and a marker reproduction position L are displayed on the graph.

In the reproducing apparatus 10 a reproducible region of the recording medium is displayed in a graph; and the current reproduction position M is displayed on the graph, and a marker reproduction position L is indicated.

In the reproducing apparatus 10 a reproducible region of the recording medium is displayed in a graph; the current reproduction position M and a marker reproduction position L are displayed on the graph; and the reproducing speed is switched according to a length from the current reproducing position M to the marker reproduction position L.

In a reproducing apparatus, a reproducible region of the recording medium is displayed in a graph; and record content of the recording medium is intermittently displayed along the graph.

The search status can be intuitively grasped by displaying a reproducible region in a graph, having the current reproduction position M and the marker reproduction position L indicated on the graph.

In this event, the operability may be enhanced by inputting the marker reproduction position L through the graph.

In a reproducing apparatus 10, for improving facility for use, the recording medium can be reproduced and displayed in a graph; and the recording medium is reproduced at the reproducing speed indicated on the graph.

In a reproducing apparatus 10, an operation status (85) is displayed on the graph.

In a reproducing apparatus 10, in response to operation of a predetermined operation button or in response to indication of an operation button displayed in a predetermined display region, the reproducing speed of the recording medium is changed; and the recording medium is reproduced at the reproducing speed indicated on the graph.

The range of a reproducible reproducing speed is displayed in a graph, a recording medium is reproduced at a reproducing speed indicated on the graph, or the operation status (85) is displayed. This enables both the reproducing speed and the operation status to be intuitively grasped, and thereby an improvement in operability is achieved.

The nature, principle and utility of the invention will become more apparent from the following detailed description when read in conjunction with the accompanying drawings in which like parts are designated by like reference numbers or characters.

BRIEF DESCRIPTION OF THE DRAWINGS

In the accompanying drawings:

FIGS. 7A to 7D are schematic diagrams illustrating the setting of the search marker;

FIGS. 8A and 8B are schematic diagrams for illustrating the icons showing the moving direction;

FIG. 9 is a schematic diagram for illustrating the switching thereof;

DETAILED DESCRIPTION OF THE INVENTION

Preferred embodiments of this invention will be described with reference to the accompanying drawings:

First Embodiment
(1) General Construction of Reproducing Apparatus

Figure 3:
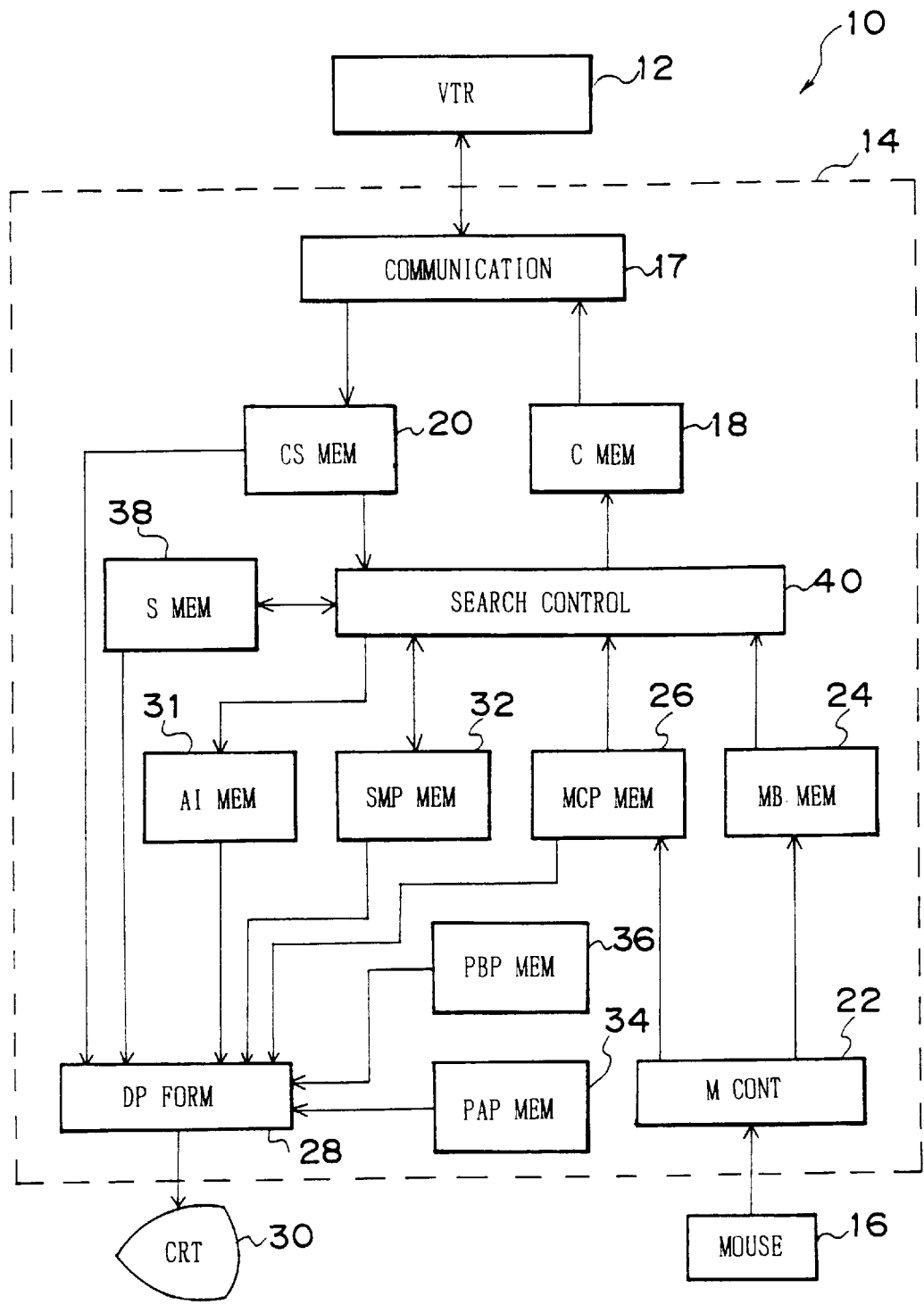
FIG. 3 is a block diagram illustrating a reproducing apparatus according to one embodiment of the present invention.
Figure 4:
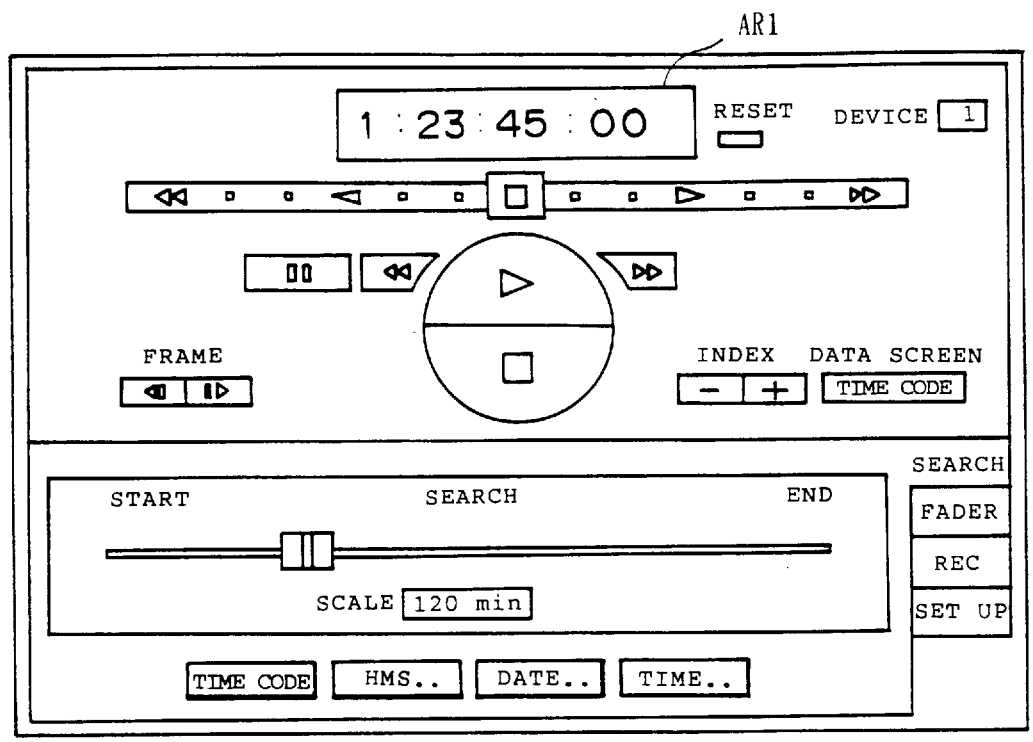
FIG. 4 is a schematic diagram showing a display picture which is constructed by the controller.

In FIG. 3, 10 generally designates a reproducing apparatus which controls the operation of the video tape recorder (VTR) 12 by a controller 14.

Here, the controller 14 is capable of controlling the operation of the video tape recorder 12 by manipulating a mouse 16 visually confirming a predetermined display picture.

More specifically, in the controller 14, control signals are sent out from a command memory means 18 to the video tape recorder 12 through a communication means 17 which is a data input/output circuit, and thereby the operation of the video tape recorder 12 is controlled.

In the controller 14, operation information of the video tape recorder 12 is inputted through the communication means 17 in this event, and information, such as the reproducing speed, time codes, etc., of the video tape recorder 12, is stored in a current status memory means 20 which is a memory circuit.

In such a fashion, the controller 14 is capable of setting operation modes, sending out control signals to the video tape recorder 12, and is furthermore capable of monitoring the reproducing position.

Moreover in the controller 14, operation data is inputted through mouse control means 22 which is a coordinate data input circuit when the mouse 16 is manipulated.

Furthermore, in the controller 14 the operation data is stored in a mouse button memory means 24 and a mouse cursor position memory means 26, and thereby the button operation of the mouse 16 and the coordinate data indicated by the mouse 16 are individually accumulated.

Moreover in the controller 14, a cathode ray tube (CRT) 30 is driven through a display picture forming means 28 which is a video signal processing circuit, and thereby a necessary display picture which is necessary for the operation of the video tape recorder 12 is formed in the cathode ray tube 30.

In this event the display picture forming means 28 displays a predetermined lever or the like on the basis of coordinate data stored in an animation icon memory means 31 which is a picture memory, a search marker position memory means 32 which is a memory circuit, a point A position memory means 34, and a point B position memory means 36.

Furthermore in the display picture forming means 28, picture display positions of a cursor (in this embodiment a symbol of a man's hand having the or index finger extended), a lever, etc., are switched on the basis of coordinate data stored in the mouse cursor position memory means 26, so that display positions of levers, etc., may be switched by operating the mouse 16.

In addition, in the display picture forming means 28 the display picture is switched according to the operation status of the video tape recorder 12 stored in the current status memory means 20, so that the search status is visually confirmed.

In this event, in the controller 14, the position or the like of the mark on the display picture is selected by a status memory means 38 on the basis of the current status memory means 20, and thereby the search status may be intuitively grasped visually confirming the display picture.

On the other hand, a search control means 40 which is an operation processing circuit switches the display picture of the cathode ray tube 30 and the operation of the video tape recorder 12 by controlling the whole operation of the controller 14.

When the search control means 40 is set in the search mode in this event, it executes a predetermined procedure to thereby display the search status of the video tape recorder 12 on the cathode ray tube 30, and this enables the reproducing apparatus 10 to be enhanced in operability.

(2) Production of a display picture

Here, the search control means 40 displays a predetermined display picture when the power is turned on. When in this event, the control mode of the video tape recorder 12 is set, the display picture of the cathode ray tube 30 is switched.

More specifically, the search control means 40 outputs control data to the video tape recorder 12 through the command memory means 18, and thereby the video tape recorder 12 is initialized.

Subsequently, the search control means 40 reads in the current status data of the video tape recorder 12 through the current status memory means 20, and on the basis of this it is detected whether or not the power of the video tape recorder 12 is turned on, and whether or not a cassette tape is charged.

In this event, the search control means 40 stores data of reproducible region of the video tape recorder 12 in the current status memory means 20, and on the basis of the corresponding speed data a display picture is produced on the cathode ray tube 30.

More specifically, in the video tape recorder 12, the index region which is provided on the magnetic tape is reproduced, and thereby the magnetic tape length data which is recorded in the region is sent out as reproducible region data.

In the case where no magnetic tape length data is recorded in the region or a magnetic tape not having the region provided is reproduced, the reproducible time is temporarily set to 120 minutes, and is stored in the current status memory means 20.

When in this occasion, the user inputs the length of the magnetic tape, the temporarily set reproducible time is updated to the user input time.

Figure 1:
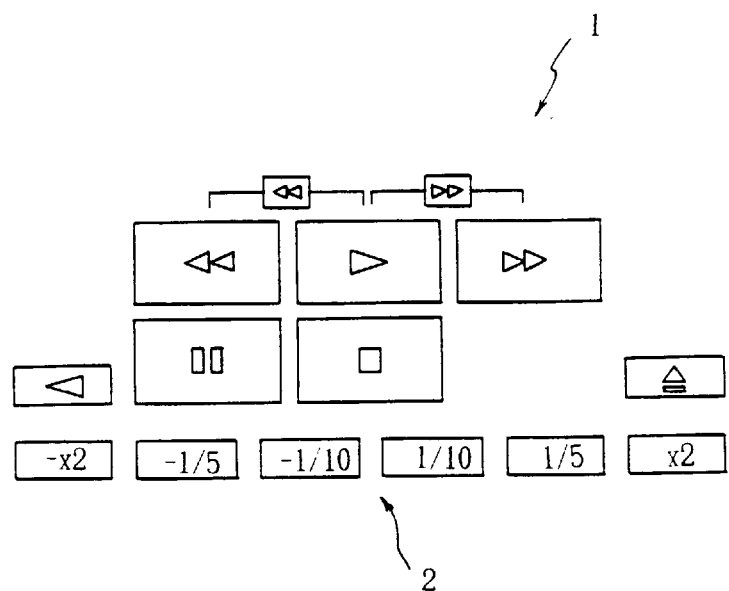
FIG. 1 is a schematic diagram for illustrating the conventional switching of the reproducing speed, using the operation button.
Figure 2:
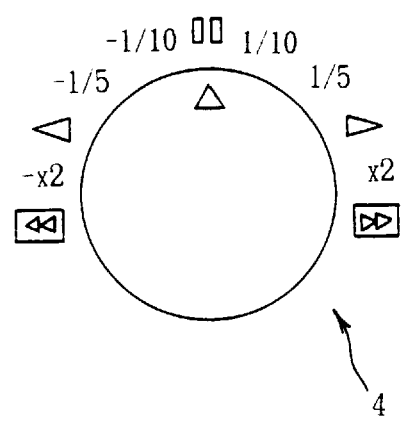
FIG. 2 is a schematic diagram for illustrating the conventional switching of the reproducing speed, using the shuttle ring.

Furthermore, the search control means 40 outputs control data to the display picture forming means 28, so that a display picture as shown in FIG. 2 is displayed on the cathode ray tube 30.

Here in the display picture of the cathode ray tube 30, a display region AR1 is formed in the upper center, and a reset switch "RESET" is displayed on the right.

In this event, a picture "0:00:00:00" is displayed in the display region AR1 of the time code since the video tape recorder 12 is in the initial state.

The search control means 40 displays a message "DEVICE 1", which is a unit number of the video tape recorder 12, in the upper right portion of the screen.

Moreover, the search control means 40 displays a reproducible reproducing speed of the video tape recorder 12 in bar graph (hereinafter referred to as speed control bar) below the display region AR1.

Furthermore, the search control means 40 displays operation buttons of play, fast forward, reverse, stop and pause below the speed control bar.

Thus, by clicking an operation button of play, fast forward, etc., or a predetermined position of the speed control bar through the mouse control means 22 the search control means 40 switches the reproducing speed of the video tape recorder 12 in response to the corresponding operation. This enables the reproducing speed of video tape recorder 12 to be intuitively grasped, and the reproducing speed to be switched with ease.

In the vicinity of the picture of the operation buttons, the search control means 40 displays operation buttons such as "TIMECODE" indicating the time code being displayed, index using search operation buttons "−" and "+", and a frame switching operation button "FRAME".

Furthermore in the lower right corner of the display picture, there are formed display regions for "SEARCH", "FADER", "REC" and "SETUP" which indicate display modes of the lower row of the display picture. The display modes of the lower row of the display picture are switched by clicking corresponding regions.

When the indicia of the "SEARCH" is clicked in this event, the search control means 40 switches the display mode to the search mode, and a bar graph (hereinafter referred as search bar) is displayed in a lower central portion of the screen.

Then, the search control means 40 indicates the current reproducing position and a position of the search marker by displaying symbols on the search bar, the symbols including a marker and a lever. This enables the search status to be visually grasped.

The user can therefore intuitively grasp the search status, and accordingly the reproducing apparatus 10 is enhanced in operability.

The search control means 40 furthermore makes it possible to move the mouse 16 after clicking the mouse 16 on the search bar and to thereby indicate a search range using the search bar. This improves the operability.

Moreover, the search control means 40 displays words "START" and "END" respectively representing the leading end and trailing end of the magnetic tape, and a word "SEARCH" indicating that the search is on. The reproducing time (120 minutes in this case) of the magnetic tape which is stored in the current status memory means 20 is displayed below the search bar.

The search control means 40 furthermore displays operation buttons, such as "TIMECODE", "HMS" and "DATE", which are referred to when the record content is searched with reference to the time code, the record date, the record time, etc.

Search Mode

Figure 5:
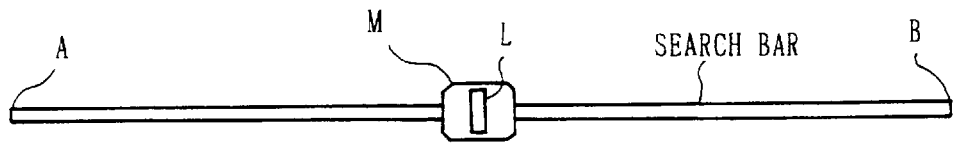
FIG. 5 is a schematic diagram showing the search bar.

Here, as shown in FIG. 5, the search control means 40 displays the current reproducing position and the search marker position by indicating a marker M and a lever L on the search bar.

In this event, the search control means 40 stores position information of the leading end and trailing end of the magnetic tape to the point A position memory means 34 and the point B position memory means 36. This makes the search bar and the magnetic tape correspond to each other at a ratio of 1:1.

Figure 6:
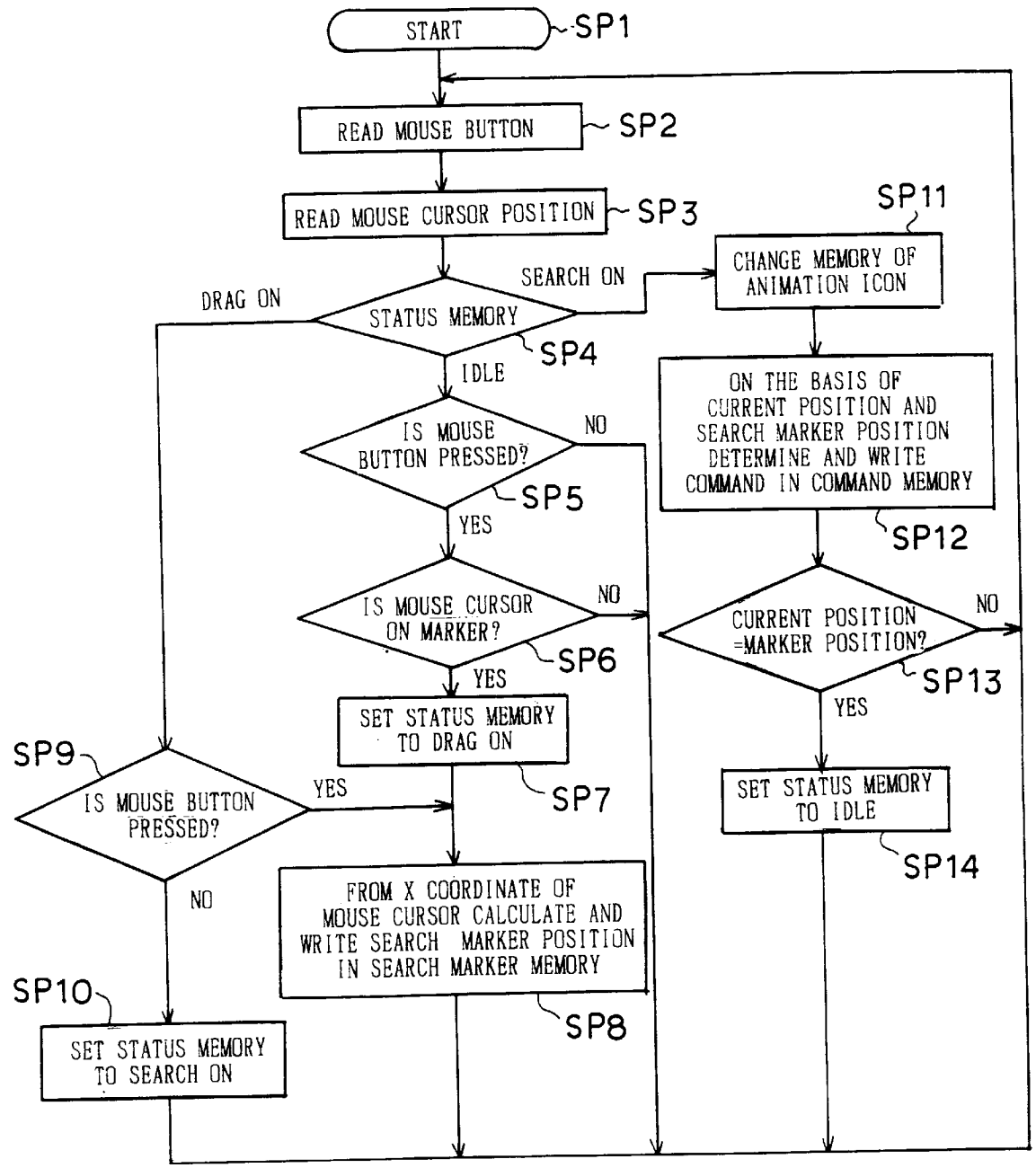
FIG. 6 is a flowchart for illustrating the operation of the search control means.
Figure 10A:
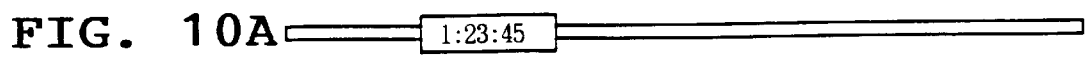
FIGS. 10A to 10D are schematic diagrams for illustrating a case of displaying also time codes.
Figure 10B:
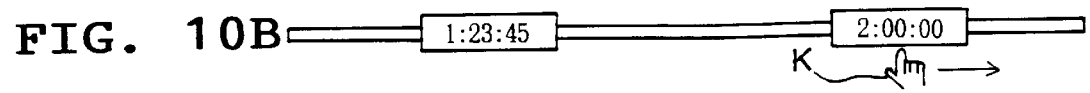
Figure 10C:
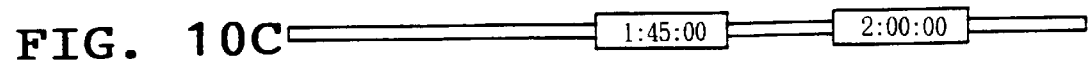
Figure 10D:
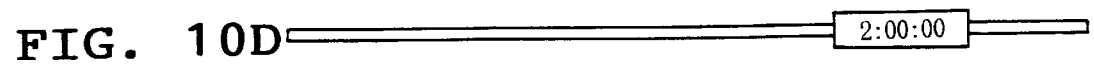

More over the search control means 40 executes the procedure as shown in FIG. 6, and thereby a search is conducted in response to the mouse 16.

More specifically, the search control means 40 proceeds from the step SP1 to the step SP2, where the memory of the mouse button memory means 24 is read out, so that information as to whether or not the mouse button is operated on is read in.

Subsequently, the search control means 40 goes to the step SP3, in which the position information of the mouse 16 is taken out by reading out the memory of the mouse cursor position memory means 26. Then, the search control means 40 goes to the step SP4.

Here, the search control means 40 searches the memory of the current status memory means 20, and judges whether the controller 14 is set in the setting mode of search marker (hereinafter referred to as dragging) or in search mode.

In the case where the controller is not set to either mode (hereinafter referred to as idle), the search control means 40 proceeds to the step SP5. On the basis of the result read in the step SP2, it is judged whether or not the mouse button is pressed down. When negative result is obtained here, then the search control means 40 returns to the step SP2.

Thus, the search control means 40 repeats the procedure including the steps SP2–SP3–SP4–SP5–SP2, and waits for the pressing of the mouse button.

When the mouse button is pressed in this state, affirmative result is obtained in the step SP5, and therefore it goes to the step SP6, where on the basis of the detection result of the cursor position it is judged whether or not the marker M is indicated by the mouse 16.

In the case where negative result is obtained here, the search control means 40 returns to the step SP2 when it judges that an operation button of reproduction, etc., is pressed, after it outputs a control signal to the video tape recorder 12 in response to the operation button. When it is judged that the user's maloperation has been made, it directly returns to the step SP2.

In the case where on the contrary the search bar is indicated, affirmative result is obtained in the step SP6, so that the search control means 40 proceeds to the step SP7 where discrimination data representing that dragging is on is stored in the status memory means 38, and then goes to the step SP8.

Here, after the x coordinate indicated by the mouse 16 is entered, the search control means 40 detects the position of the magnetic tape on the search bar from the x coordinate.

Furthermore, the search control means 40 returns to the step SP2 after the selected position of the magnetic tape is stored as the search marker position in the search marker position memory means 32.

Subsequently, the search control means 40 goes from the step SP3 to the step SP4, where it goes to the step SP9 since the status memory means 38 is set to dragging on.

Here, the search control means 40 judges whether or not the mouse button is still pressed down. When affirmative result is obtained, it goes to the step SP8.

Thus, the marker is indicated by the cursor and the mouse 16 is moved holding down the mouse button. Then, the search control means 40 repeats the procedure of the steps SP2–SP3–SP4–SP9–SP8–SP2, so that the contents of the search marker position memory means 32 are sequentially updated.

Accordingly, as shown in FIGS. 7A to 7D, the user indicates the marker M by the cursor K (FIG. 7A), and then a search marker position may be inputted by moving the mouse 16 in the direction of the search marker (the direction indicated by the arrow a) with the mouse button held down.

In this event, the lever L is moved to follow the movement of the cursor K on the display picture by updating the contents of the search marker position memory means 32 (in FIG. 7B). This enables the user to recognize the search marker position with ease.

When the user releases the mouse button in this state, the search control means 40 goes to the step SP10 since in the step SP9 negative result is obtained.

Here, the search control means 40 returns to the step SP2 after it sets the contents of the status memory means 38 during the search.

From the foregoing, in the controller 14 it is possible to input a search marker position using the search bar having a reproducible region displayed in the bar graph. In this event, the length to the search marker can be visually grasped using the search bar.

When the search mode is once set, the search control means 40 proceeds from the step SP4 to the SP11.

Here, the search control means 40 outputs a display switch signal to an animation icon memory means 31.

As a result, the search control means 40, as shown in FIGS. 8A and 8B, displays an icon on a side of the marker opposite to the search direction, the icon being like trailing smoke (FIGS. 8A and 8B). This enables the user to visually grasp the search direction.

In this event, as shown in FIG. 7 the search control means 40 sequentially switches three kinds of icons ICO1, ICO2 and ICO3 different in the shape of tails in a loop manner, so that the user can visually understand that the magnetic tape is traveling.

Subsequently, the search control means 40 goes to the step SP12, where it outputs a search control signal to the video tape recorder 12 through the command memory means 18.

When the distance from the current reproducing position to the search marker is long, in response to this the video tape recorder 12 fast forwards the magnetic tape. Then the video tape recorder 12 turns in reproducing mode when the current reproducing position comes close to the search marker, and the traveling speed of the magnetic tape is gradually decreased.

When on the contrary the distance to the search marker is short, the video tape recorder 12 turns in fast forward reproducing mode, and gradually reduces the traveling speed of the magnetic tape as the search marker comes near.

In this fashion, the record contents can be searched by such a simple operation as to move the mouse to a desired position with the mouse clicked. As a result, the reproducing apparatus 10 can be enhanced in operability.

Furthermore, the search marker position may be set on the search bar, and it is therefore possible to sensitively grasp the search amount, so that an improvement in operability is achieved.

Then, the search control means 40 goes to the step SP13, where it is judged whether or not the search marker position and the current reproducing position are the same. When negative result is obtained here, it returns to the step SP2. Therefore, the procedure of the steps SP2–SP3–SP4–SP11–SP12–SP13–SP2 is repeated until the current reproducing position reaches to the search marker position.

When the magnetic tape travels to the search marker position, affirmative result is obtained in the step SP13, so that the search control means 40 proceeds to the step SP14, where the contents of the status memory means 38 are changed to data representing an idle state. Then, the search control means 40 returns to the step SP2.

If the mouse 16 is moved with the mouse button once held down, on the display picture the marker M moves toward the lever L expressing the search marker as the magnetic tape travels (FIG. 7A). When the marker reaches to the search marker, the display picture returns to the original display status (FIG. 7D).

This enables the user to visually grasp the search status, visually confirming the position of the marker M which travels on the search bar. The reproducing apparatus 10 is therefore enhanced in operability.

The three kinds of icons which are different in tail shape are displayed circularly switching them, and this relieves boredom of the user.

(3) Advantageous Effects of the Embodiment

According to the foregoing construction, a reproducible region is displayed in a bar graph, and on the graph a reproducing position and a search marker position are indicated. Therefore, the search status can be visually recognized, so that the reproducing apparatus can be enhanced in operability.

Moreover, the search marker may be indicated on the bar graph, and therefore the search status may be intuitively and easily grasped.

(4) Other embodiments

Although in the embodiment previously described there is stated a case where the current reproducing position and search marker position are displayed using rectangular symbols, the present invention is not limited to this. Various symbols may be widely used.

As shown in FIGS. 10A to 10D, for example, to correspond to FIGS. 7A to 7D, in such a case, time code display regions are secured, and time codes of the current reproducing position and the search marker position may be displayed within the marker and the bar (FIGS. 10A to 10D).

Figure 11A:
FIGS. 11A and 11B are schematic diagrams for illustrating a case of setting the search marker, making the length of the marker variable.
Figure 11B:
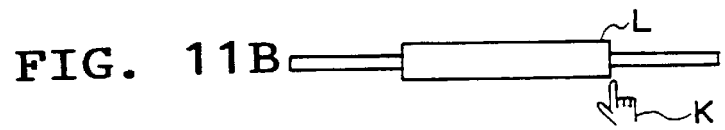

Furthermore, as shown in FIGS. 11A and 11B, a rectangular marker may be used, and a search marker position and the current reproducing position may be expressed according to the size of the marker (FIGS. 11A and 11B).

Figure 12A:
FIGS. 12A and 12B are schematic diagrams for illustrating a case where the marker is displayed in bar graph.
Figure 12B:
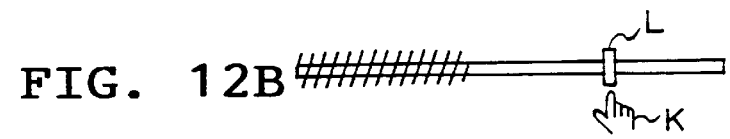

Moreover, as shown in FIGS. 12A and 12B, the magnetic tape may be expressed by a thick bar graph from the leading end to the current reproducing position, and the search marker position may be expressed by the lever L (FIGS. 12A and 12B).

Figure 13:
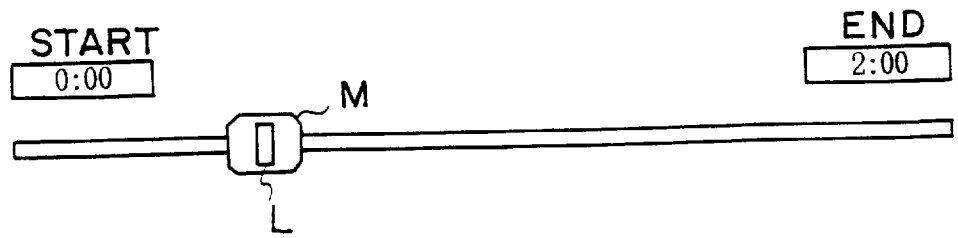
FIG. 13 is a schematic diagram for illustrating a case where the leading and trailing ends of the magnetic tape are displayed by time codes.

In the foregoing embodiment, it is described that the length of the magnetic tape is displayed below the search bar. The present invention is not limited to this and for example, as shown in FIG. 13, time codes of the leading and trailing ends may be displayed.

Figure 14:
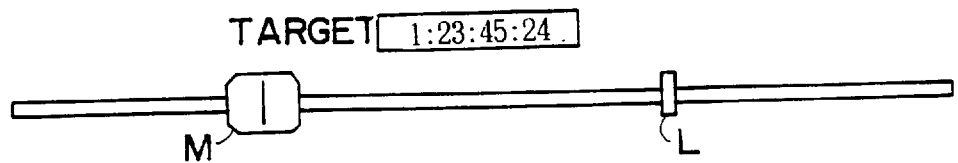
FIG. 14 is a schematic diagram for illustrating a case of displaying the search marker by the time code.

Furthermore, as illustrated in FIG. 14, the time code of the search marker position may be displayed in the vicinity of the search bar.

Figure 15:
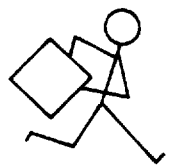
FIG. 15 is a schematic diagram for illustrating a case using the symbol of the pedestrian as the icon.
Figure 16:
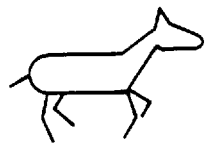
FIG. 16 is a schematic diagram for illustrating a case using the symbol of the horse as the icon.
Figure 17:
FIG. 17 is a schematic diagram for illustrating a case using the symbol of the automobile as the icon.

Moreover in the embodiment previously described, it is stated that the traveling direction of a magnetic tape is indicated using a symbol of a tail trailing smoke. The present invention is not limited to this, and as illustrated in FIGS. 15 to 17, the current reproducing position and the magnetic tape traveling direction may be expressed using symbols representing a pedestrian, an animal, an automobile, etc.. Furthermore, the magnetic tape traveling speed may be expressed switching such indicia.

In the above-described embodiment, it is described that the overall length of the magnetic tape is expressed by the search bar, but the present invention is not restricted to this. For example, a reproducible region set by the user may be displayed.

In addition to the main search bar indicating the overall length of the magnetic tape a sub-search bar which shows a status in the vicinity of a search marker may be displayed, so that the user may finely recognize a search marker position.

Furthermore, such a sub-search bar may be displayed during search only when the search marker position becomes close if necessary.

In the embodiment previously described, it is further stated that the magnetic tape traveling speed is switched according to a distance to a search marker on the side of the video tape recorder. The present invention is however not limited to this, and it may be switched on the controller side. In this case, the magnetic tape traveling speed may be switched according to the traveling speed of the mouse.

In the preceding embodiment, it is further described that the search bar is merely displayed. The present invention is, however, not limited to this, and in the case where a size reduced still picture, for example, is displayed along the search bar, recorded positions of search index signals may be also displayed.

Moreover in the previously-described embodiment it is stated that the operation is switched using the mouse. The present invention is not limited to this, and various kinds of data input means, such as a write pen, a tablet, a touch screen, may be widely used.

In such cases, a roller and an execute button, for example, may be used. Furthermore, a joystick and an execute button or a plus and minus operation buttons and an execute button may be combined.

Moreover in the embodiment previously described there is stated a case in which the operation of the video tape recorder is switched using a microcomputer. The present invention is however not restricted to this, and may be widely applied to a case where control means such as a remote commander is used.

In such a case, a speed control bar may be displayed superimposing it over a reproduced picture.

In the previously described embodiment, there is described a case where a reproducible speed is horizontally displayed in bar graph but the present invention is not limited to this. The reproducible speed may be displayed vertically or diagonally. Further, the reproducible speed may be displayed in a desired curve such as an arc and a spiral.

Moreover, the case where the record content of the video tape recorder is searched is stated in the foregoing embodiment, but the present invention is not limited to this. The present invention may be widely applied to reproducing apparatus which output reproduced signals from various recording media such as a compact disk player.

Second Embodiment (5) General Construction of the reproducing apparatus

Figure 18:
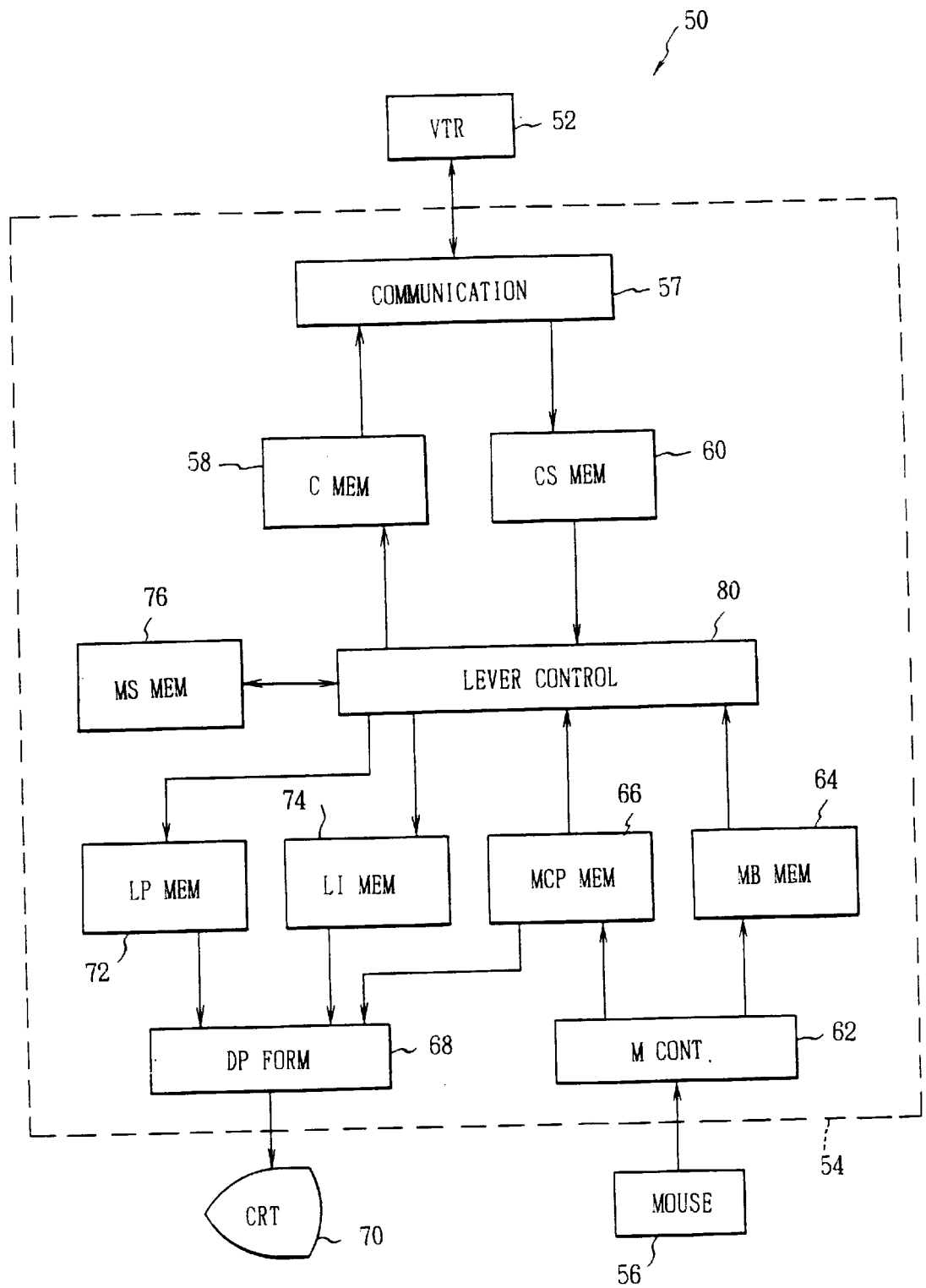
FIG. 18 is a block diagram illustrating the reproducing apparatus according to one embodiment of present invention.

In FIG. 18, 50 generally designates a reproducing apparatus, which controls the operation of the video tape recorder (VTR) 52 by a controller 54.

Here, the controller 54 is capable of changing the operation of the video tape recorder 52 by manipulating a mouse 56 visually confirming a predetermined display picture. More specifically, in the controller 54 control signals are sent out from a command memory means 58 to the video tape recorder 52 through a communication means 50 which is a data input/output circuit, and thereby the operation of the video tape recorder 52 is controlled.

In the controller 54, operation information of the video tape recorder 52 is inputted through the communication means 57 in this event, and information, such as the reproducing speed, time codes, etc., of the video tape recorder 52, is stored in a current status memory means 60 which is a memory circuit.

In such a fashion, the controller 54 is capable of setting operation modes, sending out control signals to the video tape recorder 52, and is furthermore capable of monitoring the reproduction position.

Moreover in the controller 54, operation data is inputted through mouse control means 62 which is a coordinate data input circuit when the mouse 56 is operated.

Furthermore, in the controller 54 the operation data is stored in a mouse button memory means 64 and a mouse cursor position memory means 66, and thereby the button operation of the mouse 56 and the coordinate data indicated by the mouse 56 are accumulated.

Moreover in the controller 54, a cathode ray tube (CRT) 70 is driven through a display picture forming means 68 which is a video signal processing circuit, and thereby a necessary display picture which is necessary for the operation of the video tape recorder 62 is formed on the cathode ray tube 70.

In this event the display picture forming means 68 displays predetermined pictures on the basis of coordinate data stored in a lever position memory means 72 and a lever icon memory means 74 which are memory circuits.

Furthermore in the display picture forming means 68, picture display positions of a cursor (in this embodiment a symbol of a man's hand having the or index finger extended), a lever, etc., are changed on the basis of coordinate data stored in the mouse cursor position memory means 66.

In the controller 54, speed data of the control variable of the video tape recorder 52 is inputted to a marker speed memory means 76 which is a memory circuit, and the speed of the video tape recorder 52 is controlled on the basis of the speed data.

On the other hand, a lever control means 80 which is an operation processing circuit changes the display screen of the cathode ray tube 70 and the operation of the video tape recorder 52 by controlling the whole operation of the controller 54. The lever control means 80 furthermore executes a predetermined procedure to thereby set the reproducing speed of the video tape recorder 52 to a reproducing speed indicated by the user through a mouse 56.

In such a fashion, the reproducing apparatus 50 is capable of changing the reproducing speed of the video tape recorder with ease.

(6) Production of a display picture

Here, the lever control means 80 displays a predetermined display picture when the power is turned on. When in this event, the video tape recorder 52 is set to the play mode, the display picture of the cathode ray tube 70 is changed.

More specifically, the lever control means 80 outputs control data to the video tape recorder 62 through the command memory means 58, and thereby the video tape recorder 52 is initialized.

[0022]

Subsequently, the lever control means 80 reads in the operation status data of the video tape recorder 62 through the current status memory means 60, and on the basis of this it is detected whether or not the power of the video tape recorder 52 is turned on, and whether or not a cassette tape is charged.

In this event, the lever control means 80 stores data of reproducible reproducing speed of the video tape recorder 52 in the current status memory means 60, and on the basis of the corresponding speed data a display picture is produced on the cathode ray tube 70.

Figure 19:
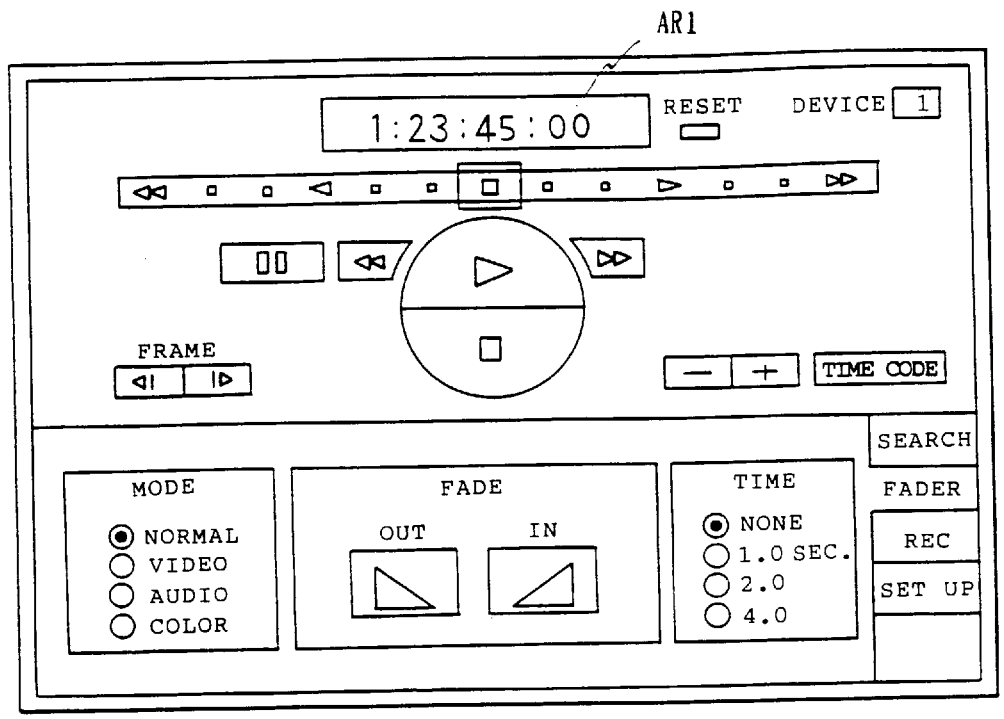
FIG. 19 is a schematic diagram showing a display picture formed by the controller thereof.

Furthermore, the lever control means 80 outputs control data to the display picture forming means 68, so that a display picture as shown in FIG. 19 is displayed on the cathode ray tube 70.

Here in the display picture of the cathode ray tube 70, a display region AR1 is formed in the upper center, and a reset switch "RESET" is displayed on the right side.

In this event, a picture "0:00:00:00" is displayed in the display region AR1 of the time code since the video tape recorder 62 is in the initial status.

The lever control means 80 displays a message "DEVICE 1", which is a unit number of the video tape recorder 52, in the upper right portion of the screen.

Moreover, the lever control means 80 displays a reproducible reproducing speed of the video tape recorder 52 in bar graph (hereinafter referred to as speed control bar) below the display region AR1.

Furthermore, the lever control means 80 displays operation buttons of play, fast forward, reverse, stop and pause below the speed control bar.

When the user clicks individual display regions manipulating the mouse 56, the lever control means 80 detects the operation through the mouse button memory means 64, and thereby changes the operation of the video tape recorder 52 through the command memory means 58 and the communication means 57.

This enables the lever control means 80 to change the operation of the video tape recorder 52 using the display pictures of the operation buttons when necessary.

In the vicinity of the pictures of the operation buttons, the lever control means 80 displays operation buttons such as "TIMECODE" indicating the time code being displayed, index using search operation buttons "−" and "+", and a frame switching operation button "FRAME". In the bottom portion, there are displayed mode changing operation buttons "MODE", fade in and fade out indicating operation buttons "FADE", operation buttons "TIME" indicating the transition time, etc.

This enables the lever control means 80 to output a control signal to the video tape recorder 52 when each of the display pictures is clicked as in the case of the user clicking operation buttons such as pause, and thereby the operation mode of the video tape recorder 52 may be changed using the display picture.

Furthermore in the lower right corner of the display screen, there are formed display regions for "SEARCH", "FADER", "REC" and "SETUP" which indicate display modes in the lower row of the display screen. The display modes at the lower row of the display screen are switched by clicking corresponding regions.

Control of the reproducing speed

Figure 20:
FIG. 20 is a schematic diagram showing the symbol of fast forwarding.
Figure 21:
FIG. 21 is a schematic diagram showing the symbol of reversing.

Here, as shown in FIGS. 20 and 21, the lever control means 80 displays symbols, indicating fast forwarding and reversing, at the opposite ends of the display region in the speed control bar, respectively.

Figure 22:
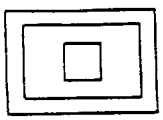
FIG. 22 is a schematic diagram showing the symbol of stop.
Figure 23:
FIG. 23 is a schematic diagram showing the symbol of normal reproduction.
Figure 24:
FIG. 24 is a schematic diagram showing the symbol of normal speed reverse reproduction.

Moreover, as shown in FIG. 22 a symbol representing stop status is displayed at the central portion of the display region. At intermediate positions between the central portion symbol and respective opposite end symbols; there are, as shown in FIGS. 23 and 24 displayed symbols respectively representing normal reproduction and reverse reproduction, the latter being equal in reproducing speed to the normal reproduction.

Furthermore, the lever control means 80 displays small rectangular dots between adjacent symbols when the video tape recorder 52 is capable of continuously varying the reproducing speed.

Figure 25:
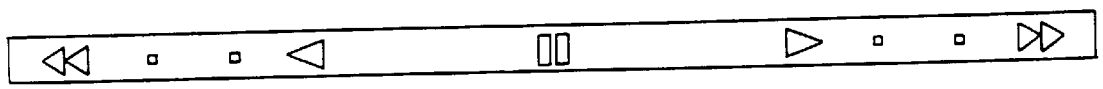
FIG. 25 is a schematic diagram showing the speed control bar in the case where slow reproduction is not possible.

In the case where the video tape recorder 52 cannot perform slow reproduction, for example, the dots are, as shown in FIG. 25, not displayed between the symbol representing normal reproduction and the symbol representing reverse reproduction which is equal in reproducing speed to the normal reproduction.

Figure 26:
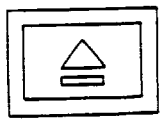
FIG. 26 is a schematic diagram showing a symbol in the case where no cassette is charged (i.e., loaded or inserted)
Figure 27:
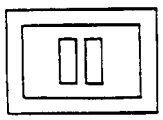
FIG. 27 is a schematic diagram showing a symbol of pause.

In this event, the lever control means 80 switches a symbol expressing the operation status of the video tape recorder 52 in response to the memory of the current status memory means 60. When no cassette tape is charged, for example, the symbol expressing stop status is changed to the symbol as shown in FIG. 26 whereas in the case of pause the symbol is changed to the symbol in FIG. 27.

Figure 28:
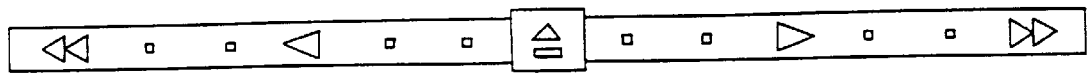
FIG. 28 is a schematic diagram showing a symbol of the speed control bar in the case where no cassette is charged.
Figure 29:
FIG. 29 is a schematic diagram showing the speed control bar in the case of pause.

The lever control means 80 therefore forms displays of the speed control bars illustrated in FIGS. 28 and 29 in the case of no cassette tape being charged and in the case of pause, respectively.

Figure 30:
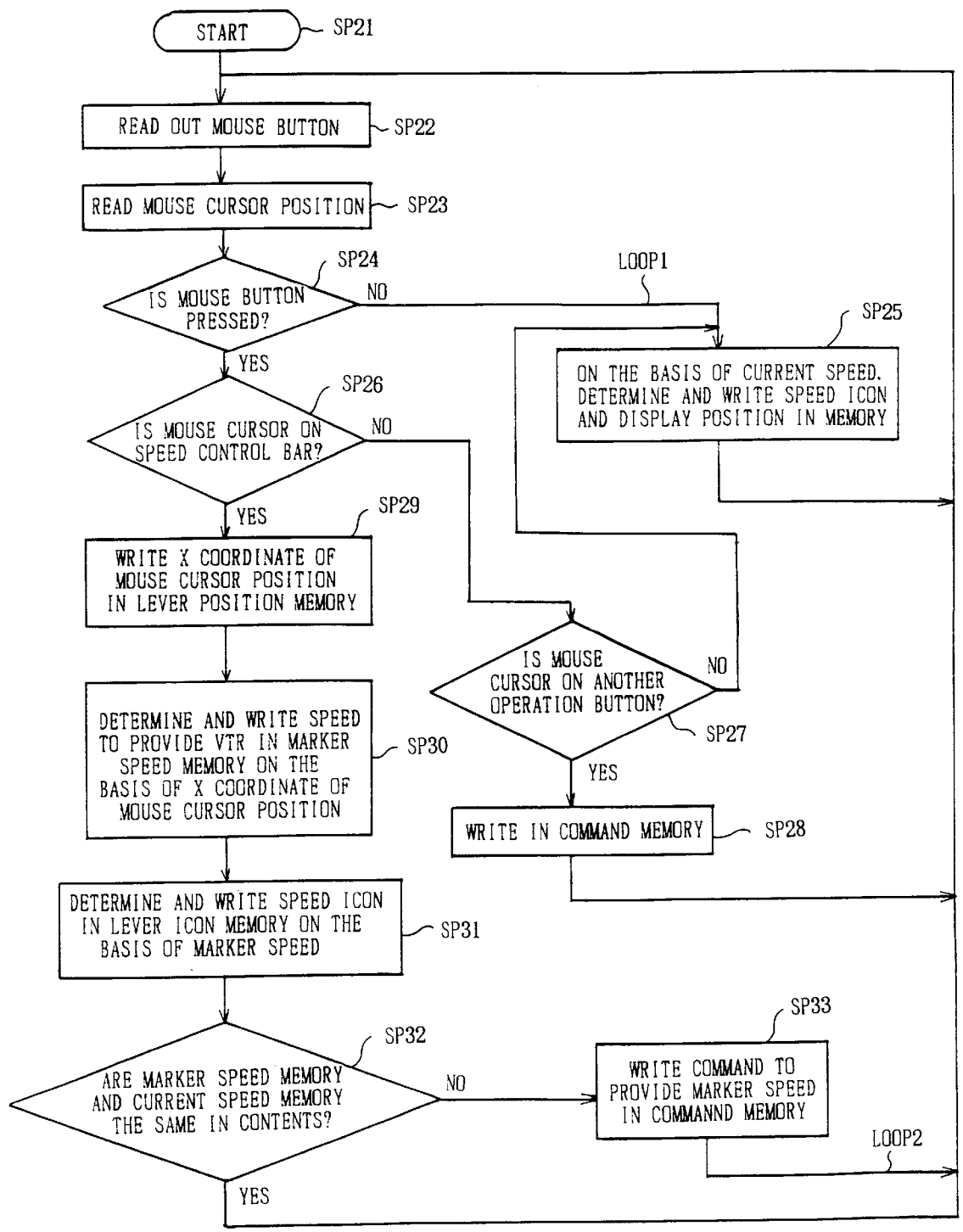
FIG. 30 is a flow chart for illustrating operation of the lever control means.

When an initial picture is formed in such a manner, the lever control means 80 executes the procedure shown in FIG. 30, and thereby controls the operation of the video tape recorder 52.

More specifically, the search control means 80 proceeds from the step SP21 to the step SP22, where the memory of the mouse button memory means 64 is read out, so that information as to whether or not the mouse button is operated on is read in.

Subsequently, the search control means 80 goes to the step SP23, in which the position information of the mouse 56 is taken out by reading out the memory of the mouse cursor position memory means 66. Then, the search control means 80 goes to the step SP24.

Here, the lever control means 80 judges on the basis of the result read in the step SP22 whether or not the mouse button is pressed. When negative result is obtained, then it goes to the step SP25.

Here, the lever control means 80 reads out the information stored in the current status memory means 60, and then selects a symbol expressing the reproducing speed (hereinafter referred as speed icon) on the basis of the reproducing speed of the video tape recorder 52 in it and at the same time selects a display position thereof. The selected results are stored in a lever icon memory means 74 and a lever position memory means 72, respectively.

This enables the lever control means 80 to detect the operation of the video tape recorder 52, and according to the detection result the operation status of the video tape recorder 52 is displayed on the speed control bar.

Figure 31:
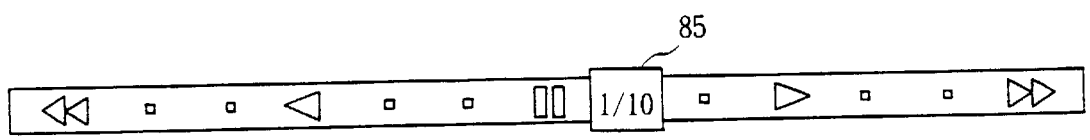
FIG. 31 is a schematic diagram showing the speed control bar in the case of $\frac{1}{10}$ time speed slow reproduction.
Figure 32:
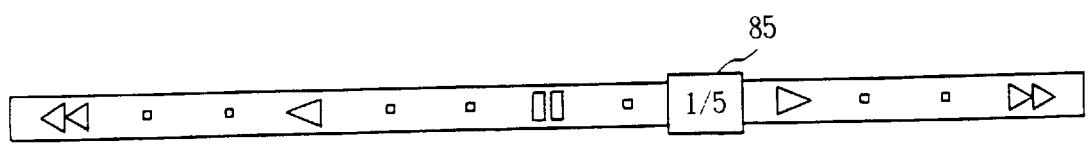
FIG. 32 is a schematic diagram showing the speed control bar in the case of $\frac{1}{5}$ time speed slow reproduction.

More specifically, when the reproducing speed is $\frac{1}{10}$ time speed or $\frac{1}{5}$ time speed of the normal reproduction as shown in FIGS. 31 and 32, a speed icon 85 which corresponds to the reproducing speed is displayed between the stop display position and the normal reproduction display position.

Figure 33:
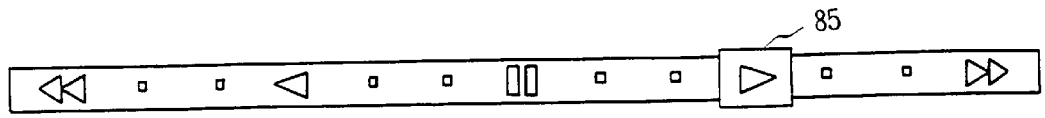
FIG. 33 is a schematic diagram showing the speed control bar in the case of normal reproduction.
Figure 34:
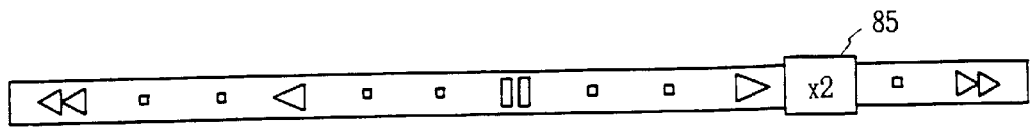
FIG. 34 is a schematic diagram showing the speed control bar in the case of high twice speed reproduction.

Similarly in cases of both normal reproduction and double speed reproduction, speed icons 85 which represent normal reproduction and double speed reproduction are, as shown in FIGS. 33 and 34, displayed at a normal reproduction display position and another display position away from normal reproduction display position toward the fast forward side, respectively.

Figure 35:
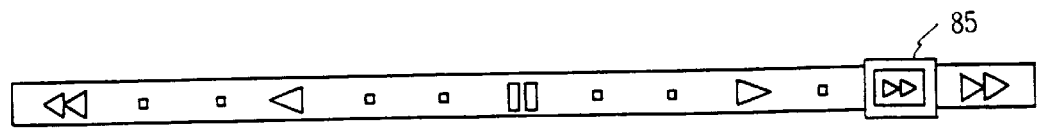
FIG. 35 is a schematic diagram showing the speed control bar in the case of fast forward reproduction.
Figure 36:
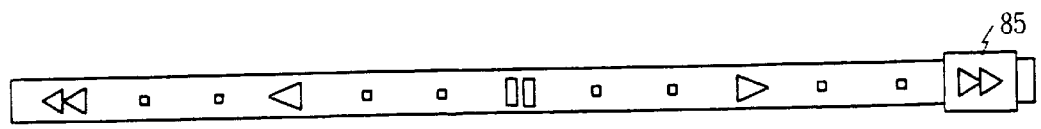
FIG. 36 is a schematic diagram showing the speed control bar in the case of fast forward.
Figure 37:
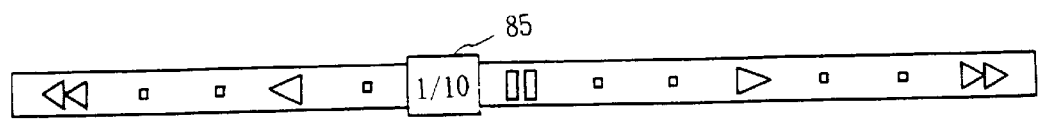
FIG. 37 is a schematic diagram showing the speed control bar in the case of $\frac{1}{10}$ time speed slow reverse reproduction.
Figure 38:
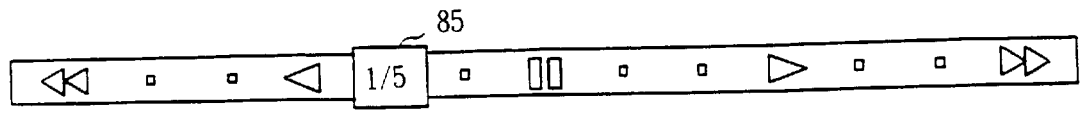
FIG. 38 is a schematic diagram showing the speed control bar in the case of $\frac{1}{5}$ time speed slow reverse reproduction.
Figure 39:
FIG. 39 is a schematic diagram showing the speed control bar in the case of normal speed reverse reproduction.
Figure 40:
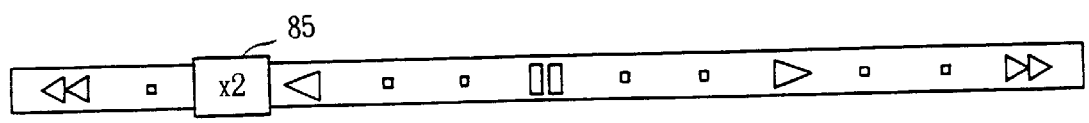
FIG. 40 is a schematic diagram showing the speed control bar in the case of high twice speed reverse reproduction.
Figure 41:
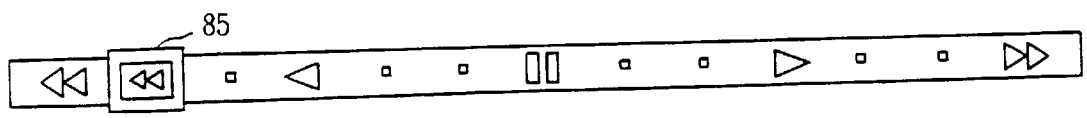
FIG. 41 is a schematic diagram showing the speed control bar in the case of high speed reverse reproduction.
Figure 42:
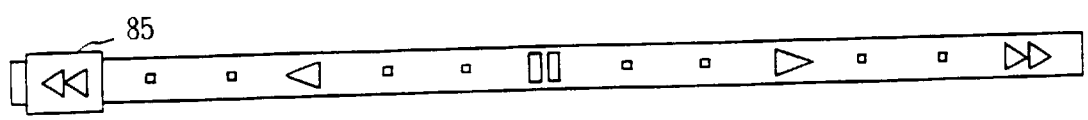
FIG. 42 is a schematic diagram showing the speed control bar in the case of reversing.

Furthermore, in cases of fast forward reproduction and fast forward speed icons 85 which represent fast forward reproduction and fast forward are, as shown in FIGS. 35 and 36, displayed at corresponding display positions. In the case of fast forward reproduction, there is displayed the speed icon 85 which has the inside doubly blocked so as to be easily distinguished from the fast forward speed icon 85.

A speed icon is displayed at the corresponding position on the speed control bar in response to the reproducing speed in the case where the reproducing speed of the video tape recorder 52 is not equal to the reproducing speed which corresponds to each of the previously described display positions: for example, the reproducing speed is $\frac{1}{2}$, $\frac{1}{3}$, ... $\frac{1}{8}$ times of the normal reproducing speed; and the reproducing speed is 3 and 4 times of the normal reproducing speed (for example, in the case of $\frac{1}{8}$ time speed, the speed icon is displayed at a substantially intermediate position between the $\frac{1}{5}$ time speed display position and the normal reproduction display position).

In this event, the lever control means 80 updates the contents of the speed icon 85 in response to the reproducing speed, and changes the numeral in the speed icon 85 to $\frac{1}{2}$, $\frac{1}{3}$, ... or $\frac{1}{8}$ in the case of $\frac{1}{2}$, $\frac{1}{3}$, ..., or $\frac{1}{8}$ time speed, for example.

In this manner, the controller 54 displays a reproducible reproducing speed in a bar graph on the cathode ray tube 70, and further displays an actual reproducing speed of the video tape recorder 52 on the bar graph.

The user can therefore intuitively grasp the reproducing speed of the video tape recorder 52, and this enables the video tape recorder 52 to be enhanced in operability.

Moreover, the controller 54 displays the operation statuses of the video tape recorder 52 except the reproducing speed (that is, stop, no cassette, and pause statuses) on the speed control bar, and therefore other than the reproducing speed the operation statuses of the video tape recorder 52 may be intuitively grasped visually confirming the speed control bar. Therefore, the video tape recorder 52 is further improved in operability.

In the case of the video tape recorder 52 performing reverse reproduction as shown in FIGS. 37 to 42, the lever control means 80 selects and displays a speed icon 85 according the reproducing speed as in the case of the normal reproduction.

In the step SP25, the lever control means 80 simultaneously changes the display of the time code on the cathode ray tube 70 in response to the data of the time code stored in the current status memory means 60.

After executing the processing of the step SP25, the lever control means 80 returns to the step SP22, and thereby repeats the loop LOOP1 of steps SP22–SP23–SP24–SP25–SP22 until the mouse button is pressed.

In the case where the reproducing speed of the video tape recorder 52 is gradually changed, the lever control means 80 therefore moves the display position of the speed icon 85, following changes of the reproducing speed, and at the same time updates the content of the speed icon 85. Therefore, changes of the reproducing speed may be intuitively recognized on the speed control bar.

The controller 54 is therefore capable of enhancing the video tape recorder 52 in operability.

When on the other hand the mouse button is pressed, affirmative result is obtained in the step SP24, and thus the lever control means-80 proceeds to the step SP26.

Here, on the basis of the detection result of the cursor position the lever control means 80 makes a judgement as to whether or not the speed control bar is indicated by the mouse.

When negative outcome is obtained here, the lever control means 80 goes to the step SP27, where it judges whether or not any operation button such as play and fast forward operation buttons is indicated. When negative result is obtained here, it goes to the step SP25.

Even if the mouse is erroneously clicked, the lever control means 80 therefore continues the updating operations of the speed icon and the display position of the latter.

When on the contrary affirmative result is obtained in the step SP27, the lever control means 80 goes to the step SP28, where a control command which corresponds to the operation button indicated is stored in the command memory means 58.

The lever control means 80 therefore outputs a control signal to the video tape recorder 52 through the command memory means 58.

In this manner, the user moves the cursor on the display of the operation button manipulating the mouse, and then clicks the mouse button, so that the operation of the video tape recorder 52 may be changed with ease.

In the case where the speed of the video tape recorder 52 is changed in this stage, the lever control means 80 temporally stores a desired reproducing speed in the marker speed memory means 76, and then stores a command in the command memory means 58 to provide that reproducing speed.

After outputting a control signal to the video tape recorder 52, the lever control means 80 returns to the step SP22.

When on the other hand the speed control bar is indicated by the mouse 56, the lever control means 80 goes to the step SP29 since affirmative result is obtained in the step SP26. Here, the x coordinate indicated by the mouse 56 is stored in the lever position memory means 72.

Subsequently, the lever control means 80 goes to the step SP30, where the reproducing speed indicated on the speed control bar is determined from the x coordinate indicated by the mouse 56. The determined reproducing speed is stored in the marker speed memory means 76.

Then, the lever control means 80 proceeds to the step SP31, where a speed icon is selected on the basis of the marker speed stored in the marker speed memory means 76, and is stored in the lever icon memory means 74.

Subsequently, the lever control means 80 judges whether or not the current reproducing speed stored in the current status memory means 60 is equal to the marker speed. When negative result is obtained here, it goes to the step SP33, and stores a command necessary for setting the marker speed in the command memory means 58.

Figure 43A:
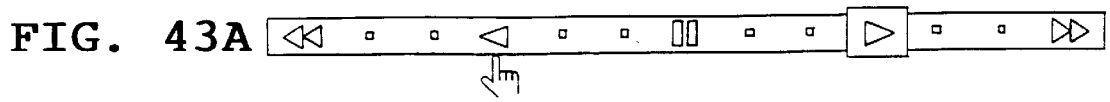
FIGS. 43A and 43B are schematic diagrams for illustrating the switching of the reproducing speed.
Figure 43B:
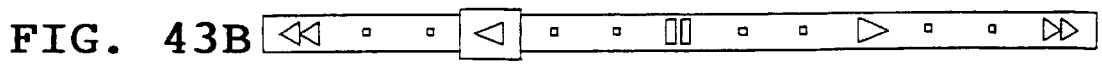

When the reverse reproduction position on the speed bar is clicked by the mouse 56 (FIG. 43A), a speed icon which corresponds to the reproducing speed indicated on the speed control bar is displayed at the position, stored in the lever position memory means 72, on speed control bar (FIG. 43B).

Furthermore, a command is sent out to the video tape recorder 52 so as to provide the indicated reproducing speed.

In this manner, the controller 54 is capable of changing the reproducing speed by clicking the mouse on the speed control bar.

The user can therefore visually recognize a reproducible reproducing speed displayed on the bar graph, and can intuitively grasp the changing operation of the reproducing speed by changing the reproducing speed on the bar graph. The video tape recorder 52 is therefore enhanced in operability.

Moreover, the controller 54 is capable of efficiently displaying necessary operation buttons in a small display region by indicating the operation speed with the speed control bar.

In the case where a combination with separate operation buttons, such as replay, is used, any change of mode is not needed each time for changing the reproducing speed. The reproducing speed may be therefore set with ease, and the video tape recorder 52 can be thus enhanced in operability.

On completing the processing of the step SP33, the lever control means 80 returns to the step SP22, and also when affirmative result is obtained in the step SP32, it returns to the step SP22.

When the mouse 56 is gradually moved while it is being clicked, the lever control means 80 repeats the loop LOOP2 of the steps SP22–SP23–SP24–SP26–SP29–SP30–SP31–SP32–SP33–SP22, and thereby the reproducing speed of the video tape recorder 52 continuously changes.

Figure 44A:
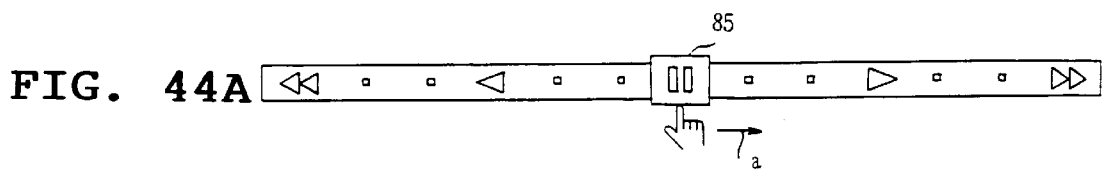
FIGS. 44A to 44D are schematic diagrams illustrating continuous switching of the reproducing speed.
Figure 44B:
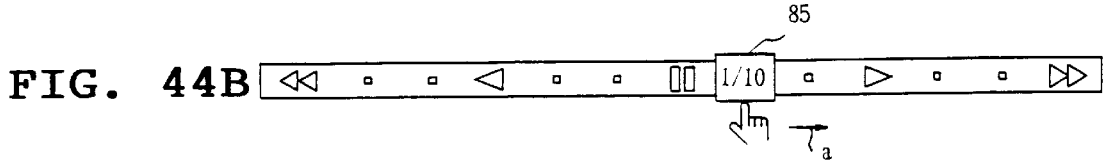
Figure 44C:
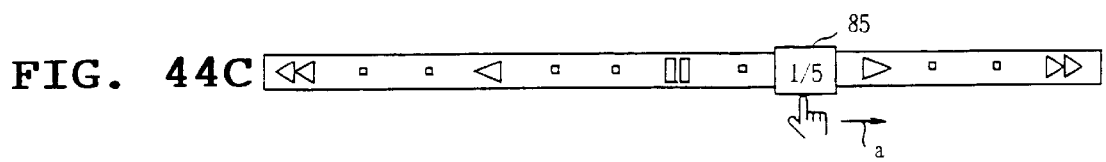
Figure 44D:
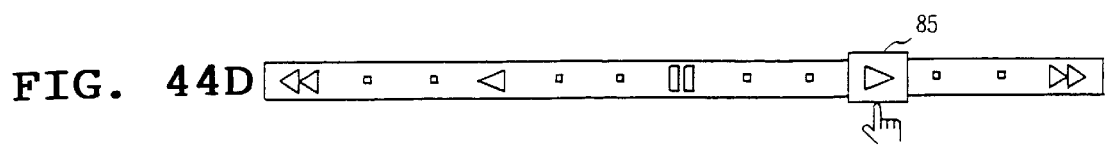

More specifically, firstly the cursor is placed on the speed icon 85 representing the operation status of the video tape recorder 52 and then the mouse button is depressed (FIG. 44A). Subsequently in this status the mouse 56 is moved to the right. This gradually moves the display position of the speed icon 85 (as shown by the arrow a) as the cursor moves, and therefore the content is updated (FIGS. 44B and 44C). In this manner, the reproducing speed of the video tape recorder 52 may be gradually changed, and the reproducing speed of the position where the mouse button is released may be set (FIG. 44D).

In this event, the controller 54 passes only the x coordinate to the lever position memory means 72 and lever icon memory means 74, and even in the case where the mouse 56 is moved with vertical displacement, the speed icon 85 and the cursor are therefore smoothly moved.

Moreover, in this event x coordinates of the speed icon 85 and the cursor are stored in separate storing means, and therefore the reproducing speed of the video tape recorder 52 may be smoothly changed even when the mouse 56 is moved in the x axis direction in a not smooth manner. This enables the video tape recorder 52 to be enhanced in operability.

A video tape recorder 52 may have a construction such that the actual reproducing speed of the video tape recorder 52 is detected and that reproducing speed is stored in the lever position memory means in the step SP25, whereby the reproducing speed is gradually changed in response to commands (for example, a video tape recorder which gradually reduces the reproducing speed and then outputs a still picture when a pause command is outputted). In controlling the video tape recorder 52 having such a construction, the speed icon 85 is gradually updated in response to the actual reproducing speed of the video tape recorder 52, and thereby the operation status or the like of the video tape recorder can be further intuitively grasped.

The video tape recorder is enhanced in operability continuously changing the reproducing speed without switching the mode as in the case of using a shuttle ring.

(7) Advantageous Effects of Second Embodiment

According to the foregoing construction, the reproducible reproducing speed of the video tape recorder 52 is displayed in a bar graph, and the operation status of the video tape recorder 52 is displayed on the bar graph. Furthermore, the reproducing speed of the video tape recorder 52 is set on the bar graph. Therefore, the reproducing speed of the video tape recorder 52 may be intuitively grasped, and may be changed by simple operation. As a result, the video tape recorder 52 is enhanced in operability.

(8) Other Embodiments

In the previously-described embodiment it is stated that the operation is changed using the mouse. The present invention is not limited to this, and various kinds of data input means, such as a write pen, a tablet, a touch screen, may be widely used.

In such cases, a roller and an execute button, for example, may be used. Furthermore, a joystick and an execute button or a plus and minus operation buttons and an execute button may be combined.

Moreover in the embodiment previously described there is stated a case in which the operation of the video tape recorder is changed using a microcomputer. The present invention is however not restricted to this, and may be widely applied to a case where control means such as a remote commander is used.

In such a case, a speed control bar may be displayed superimposing it over a reproduced picture.

In the previously described embodiment, there is described a case where a reproducible speed is horizontally displayed in a bar graph, but the present invention is not limited to this. The reproducible speed may be displayed vertically or diagonally. Further, the reproducible speed may be displayed in a desired curve such as an arc and a spiral.

Moreover, the case where the record content of the video tape recorder is searched is described in the foregoing embodiment but the present invention is not limited to this. The present invention may be widely applied to reproduction units which output reproduced signals from various recording media such as a compact disk player.

According to the present invention, the reproducible region is displayed in a bar graph, and a reproducing position and a reproducing marker position are indicated in the graph. The present invention therefore provides a reproducing apparatus which is capable of visually recognizing the search status, and is thereby capable of enhancing operability of the reproducing apparatus.

According to the present invention, the reproducible speed is displayed in a bar graph, and a reproducing speed is indicated on the graph. The present invention therefore provides a reproducing apparatus which is therefore capable of intuitively and easily grasping the reproducing speed efficiently using small display regions, and is thereby capable of enhancing the operability thereof.

While the preferred embodiments of the invention name been disclosed, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An apparatus for reproducing a video signal, comprising:

reproducing means for reproducing a video signal from all of a reproducible region of a recording medium such that a video output is produced on a video display device and for moving said medium to a current reproducing position;

command input means including a mouse for inputting a command for controlling said reproducing means, said mouse controlling a cursor for positioning a search marker icon to specify a desired target reproducing position anywhere within said reproducible region of said recording medium;

display means forming a continuous graph displaying said search maker icon and a current position icon representing said current reproducing position of said medium; and control means for controlling said reproducing means in response to said command so as to send information of a reproducing status of said reproducing means to said display means, whereby said reproducing means effects movement of said current reproducing position by moving said recording medium at a predetermined speed into coincidence with said desired target reproducing position and said current position icon approaches said search maker icon in real time so that said graph forms a continuous display of said movement of said reproducing means as it occurs, movement of said current position icon being illustrated by indicia associated with said current position icon indicating a direction of motion, and said search marker icon and said current position icon are displayed in superimposed relation when said current reproducing position equals said desired target reproducing positions, wherein said reproducing means effects movement of said recording medium in a first mode where said recording medium is moved at a fast forward speed faster than a normal playback speed and no video output is displayed on said video output device and in a second mode where said recording medium is moved at a fast forward reproducing speed and where said video output is displayed on said video display device, and said control means switches said reproducing means from said first mode to said second mode when a length of said recording medium between said current reproducing position and said desired target reproducing position is less than a predetermined length.

2. The apparatus for reproducing a video signal according to claim 1 wherein:

said control means switches a reproducing speed of said reproducing means and a moving speed of the current position icon displayed on said graph in response to a moving speed of the mouse.

3. The apparatus for reproducing a video signal according to claim 1 wherein:

said display means displays a reproducing speed region adjacent said graph and displays the current reproducing speed on said reproducing speed region on the basis of information of a reproducible speed range in which said reproducing means can reproduce and the current reproducing speed.

4. The apparatus for reproducing a video signal according to claim 3 wherein:

said command input means selects a reproducing speed symbol position displayed on said reproducing speed region so as to input the selected reproducing speed to said reproducing means.

5. The apparatus for reproducing a video signal according to claim 3 wherein:

said display means displays an operation status of said reproducing means on said reproducing speed region.

6. The apparatus for reproducing a video signal according to claim 3 wherein:

said display means displays a reproducing mode of said reproducing means on said reproducing speed region.

7. The apparatus according to claim 1, wherein said indicia associated with said current position icon represents triangular shapes at a trailing side of said current position icon.

8. The apparatus according to claim 1, wherein said display means sequentially displays a plurality of indicia associated with said current position icon such that said indicia appear as a graphical figure.

9. The apparatus according to claim 1, wherein said indicia associated with said current position icon are graphical figures with an apparent direction of forward motion.

10. The apparatus according to claim 9, wherein said indicia are images of a running animal.

11. The apparatus according to claim 9, wherein said indicia are images of a moving vehicle.

12. A video signal reproducing system, comprising:

a reproducing unit for reproducing a video signal from all of a reproducing region of a recording medium and for transporting said recording medium past a reproducing head at a predetermined speed in a predetermined direction, wherein a position of said reproducing head on said recording medium is a current reproducing position;

a command input unit including a mouse for inputting commands to control reproduction and transportation operations of said reproducing unit, said mouse controlling a cursor positioning a search marker icon to specify a desired target reproducing position anywhere within said reproducing region of said recording medium;

a display unit forming a continuous graph displaying said search marker icon and a current position icon representing said current reproducing position of said recording medium; and a control unit for controlling said reproducing unit in response to said commands so as to send out information representing a reproduction status of said reproducing unit to said display unit, whereby said reproducing unit effects movement of said recording medium from said current reproducing position into coincidence with said desired target reproducing position and said current position icon approaches said search marker icon in real time so that said graph forms a continuous display of said movement of said current reproducing position as it occurs, movement of said current position icon being illustrated by indicia associated with said current position icon indicating a direction of motion, and said search marker icon and said current position icon are displayed in superimposed relation when said current reproducing position equals said desired target reproducing position, said reproduction unit having a first mode wherein said recording medium is transported at a fast forward speed faster than a normal playback speed and no video signal is reproduced and a second mode wherein said recording medium is transported at a fast forward reproducing speed and said video signal is reproduced, said fast forward reproducing speed being faster than the normal playback speed, said control unit placing said reproducing unit in said first mode when a distance between said current reproducing position and said target reproducing position is greater than a predetermined distance and placing said reproducing unit in said second mode when said distance is less than said predetermined distance.

13. The video signal reproducing system according to claim 12, further comprising:

a reproducing speed range region adjacent said continuous graph for displaying a reproducing speed range at which said reproducing unit may reproduce said recording medium and information of the current reproducing speed.

14. The system according to claim 12, wherein said indicia associated with said current position icon represent triangular shapes at a trailing side of said current position icon.

15. The system according to claim 12, wherein said display means sequentially displays a plurality of indicia associated with said current position icon such that said indicia appear as a graphical figure.

16. The system according to claim 12, wherein said indicia associated with said current position icon are graphical figures with an apparent direction of forward motion.

17. The system according to claim 16, wherein said indicia are images of a running animal.

18. The system according to claim 16, wherein said indicia are images of a moving vehicle.

19. The system according to claim 12, wherein said display unit receives said video signal from said reproducing unit and displays said graph superimposed on a display of said video signal.

* * * * *